United States Patent
Konecny

[19]

[11] Patent Number: 6,157,150
[45] Date of Patent: Dec. 5, 2000

[54] BRUSHLESS SENSORLESS DC MOTOR ASSEMBLY WITH PRECISELY CONTROLLABLE POSITIONING

[75] Inventor: Karl Konecny, Hillsboro, Oreg.

[73] Assignee: Semipower Systems, Inc., Hillsboro, Oreg.

[21] Appl. No.: 09/232,412

[22] Filed: Jan. 15, 1999

[51] Int. Cl.[7] .................................................. H02K 29/00
[52] U.S. Cl. ..................... 318/254; 318/138; 318/254 A; 318/439
[58] Field of Search .................................. 318/254, 138, 318/254 A, 439, 245; 369/268

[56] References Cited

U.S. PATENT DOCUMENTS

| | | | |
|---|---|---|---|
| 4,479,078 | 10/1984 | Kidd et al. ............................... | 318/254 |
| 4,509,001 | 4/1985 | Wakabayashi et al. ................. | 318/687 |
| 4,686,437 | 8/1987 | Langley et al. .......................... | 318/254 |
| 4,874,997 | 10/1989 | Daggett et al. ....................... | 318/568.1 |
| 4,928,043 | 5/1990 | Plunkett .................................. | 318/254 |
| 4,970,445 | 11/1990 | Kimura et al. ........................... | 318/254 |
| 5,115,172 | 5/1992 | Ishii et al. ................................. | 318/38 |
| 5,187,417 | 2/1993 | Minnich et al. ........................ | 318/254 |
| 5,325,036 | 6/1994 | Diethert et al. ......................... | 318/802 |
| 5,426,354 | 6/1995 | Bausch ................................... | 318/254 |
| 5,451,832 | 9/1995 | Cameron et al. ....................... | 318/375 |
| 5,517,095 | 5/1996 | Carobolante et al. .................. | 318/254 |
| 5,572,097 | 11/1996 | Cameron ................................. | 318/254 |
| 5,589,751 | 12/1996 | Lim ........................................ | 318/701 |
| 5,612,599 | 3/1997 | Itami et al. ............................. | 318/254 |
| 5,619,109 | 4/1997 | Cameron et al. ....................... | 318/375 |
| 5,717,299 | 2/1998 | Inagaki et al. .......................... | 318/254 |
| 5,793,180 | 8/1998 | Maiocchi et al. ...................... | 318/778 |
| 5,796,194 | 8/1998 | Archer et al. .......................... | 310/68 B |
| 5,982,117 | 11/1999 | Taylor et al. ........................... | 318/254 |

*Primary Examiner*—Paul Ip
*Attorney, Agent, or Firm*—Timothy E. Siegel

[57] ABSTRACT

A brushless sensorless DC motor assembly computes rotor position by examining the current measurements of the stator windings. The brushless DC motor assembly includes a rotor and a set of stator windings that are adapted to drive the rotor. In addition, a power amplifier is adapted to apply a voltage to each stator winding in sequence according to a received sequence of switching signals. Also included is a terminal that is adapted to receive a commanded rotor stopping position from a user input device or a controlling computer. A current sensing assembly permits the determination of the current through each stator coil to produce a sequence of stator coil current values over time. A data processor is adapted to calculate the sequence of switching signals based on the received commanded rotor position and the computed rotor position. The calculation of the computed rotor position is based on the most recent set of stator coil current values and the most recent set of the computed switching signals.

12 Claims, 6 Drawing Sheets

BRUSHLESS SENSORLESS DC MOTOR ASSEMBLY WITH PRECISELY CONTROLLABLE POSITIONING

BACKGROUND OF THE INVENTION

The present invention involves the computation of a rotor position for a brushless DC motor assembly that does not include a rotor position sensor.

Furthermore, the present invention involves the use of the computed rotor position to control the rotor position.

Brushless DC motors are typically used in the 0.5 to 5 horsepower range and in applications in which there is a fair amount of stopping at precisely controlled positions. One example of this type of application is in the drive for an x-y table in a machining operation. An x-y table moves a workpiece in an x-y plane while the workpiece is being machined by, for example, a laser. Quick acceleration is desirable so that the machining may be performed rapidly. Perhaps more importantly, table positioning repeatability is crucial, so that the machining can be accurate.

Because of the need for precisely repeatable stopping that is necessitated by applications such as x-y table control, brushless DC motors (BDCMs) typically include some device for sensing rotor position. This information is then fed to a servo so that stopping position may be accurately controlled. Unfortunately, the sensors used for this purpose tend to be expensive, frequently costing as much as the motor does, and delicate.

Figure 1:
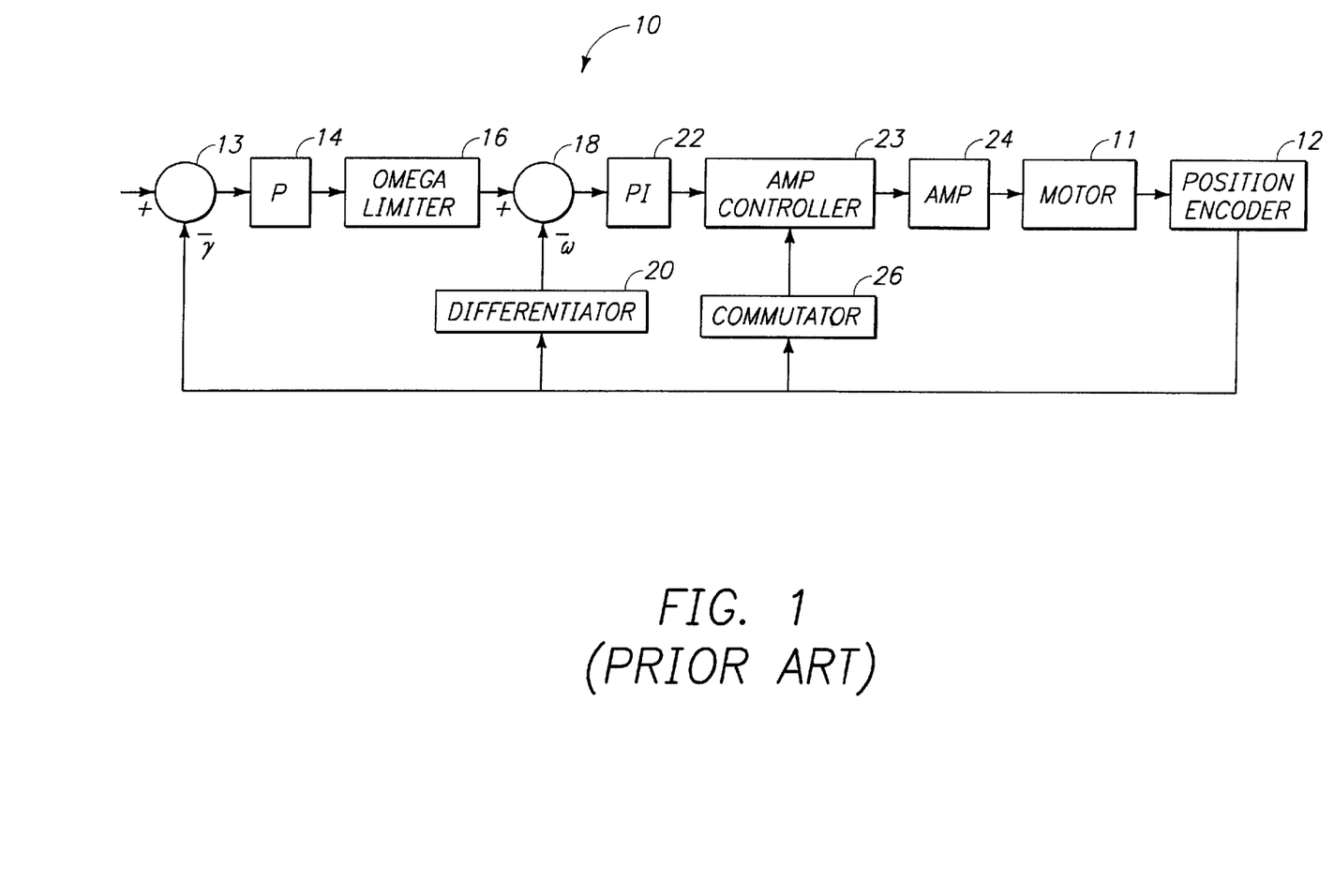
FIG. 1 is a block diagram, showing the servo loops, of a brushless DC motor assembly according to the prior art.

FIG. 1 shows a typical prior art servo control loop 10 for a BDCM 11. Everything shown, except for BDCM 11, position encoder 12 and amplifier 24 is implemented as software in a data processing assembly that forms a part of the motor assembly. Because both the prior art system and the system of the invention may be digital, this application contains many references to time intervals. The position encoder periodically forms measurements of the rotor position which are sent to the rest of the system in digital form. These measurements are time indexed by a subscript "n" in the equations that follow, although this subscript may be omitted when the equation includes variables from a single time interval only. The duration of the time intervals between measurements is denoted by "dt." The current time interval is denoted by "N." These conventions remain constant both in the discussion of the prior art and the invention.

To determine a position error the measured rotor $\theta_m$, from a position encoder 12, is subtracted from the commanded rotor stopping position $\theta_c$ at a comparator 13. This is multiplied by a constant, $k_\theta$, at a P block 14 and limited by an $\omega$ (rotor speed) limiter 16 to find the commanded $\omega$, $\omega_c$. The limiter 16 sets the value of $\omega_c$ as follows:

$$\omega_c = \min\{\omega_m + \max\omega_\delta;\ \omega_{max};\ k_\theta(\theta_c - \theta_m)\} \quad (1)$$

Where $\max\omega_\delta$ and $\omega_{max}$ are user selected and represent respectively the maximum increase in $\omega_c$ in one time interval and the maximum value for $\omega_c$.

The limiter is necessary because the commanded position $\theta_c$ may have a large value that reflects, for example, several thousand rotations beyond the measured position $\theta_m$. In this event, without the limiter 16, $\omega_c$ would assume a larger value than could be supported by the BDCM 11. When $\theta_c - \theta_m$ becomes small, however, it is desirable for $\omega_c$ to decrease in anticipation of the rotor stopping. Also, when the motor is first beginning to rotate, $\max\omega_\delta$ keeps commanded acceleration to within achievable limits.

At a differentiating block 20 $\theta_m$ is differentiated to yield the measured rotor speed $\omega_m$, which, at a comparator block 18 is subtracted from $\omega_c$ (for subsequent time interval N+1). The resultant value $\omega_\delta$ is fed through a PI block 22, which performs the following operation:

$$T_{cN} = k_1 \Sigma_0^N \omega_{\delta n} dt + k_2 \omega N \quad (2)$$

The output, $T_{cN}$, is referred to as the torque or current command and is sent to an amplifier controller 23. The encoder values also feed a commutator 26 that has the task of supplying, to the amplifier controller, the angle for the electromagnetic field to be created by the stator windings as driven by the amplifier 24.

Figure 2:
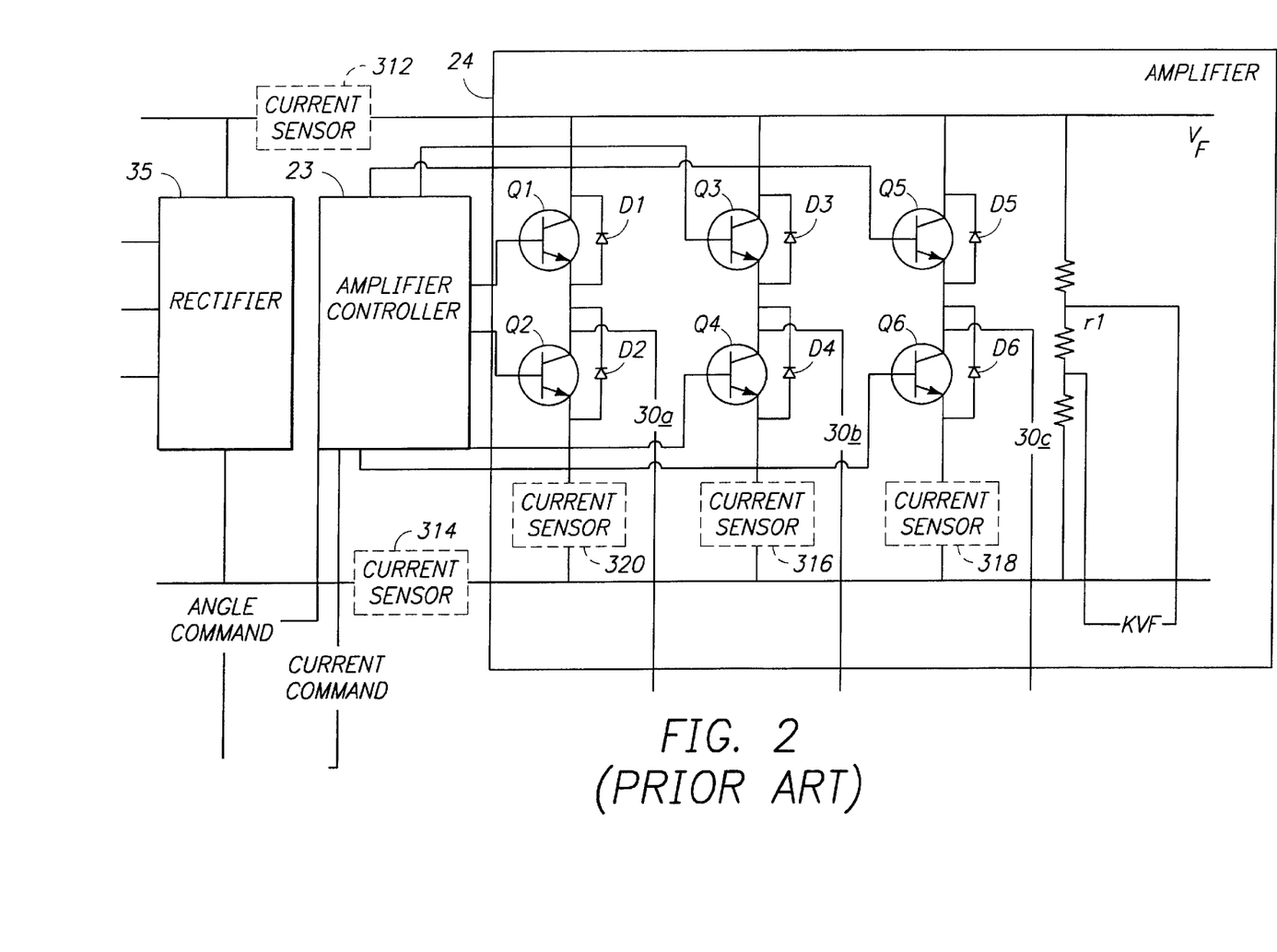
FIG. 2 is a schematic diagram of the switching amplifier of FIG. 1.

FIG. 2 shows amplifier 24 having a set of six transistors $Q_1$–$Q_6$ that are controlled by controller 23 to create an electromagnetic field of the commanded angle and magnitude (as received from the commutator 26 and PI block 22) by controlling the current through the stator windings of BDCM 11, each of which is connected to an output line 30a–30c. Diodes D1–D6 are for safety purposes. The voltage at the top or front of the swithces, $V_f$ is produced by a rectifier 35 and is measured by resister $R_1$, because there may be occasional deviations from the desired value of $V_f$. The voltage at each one of the terminals 30a–30c may be deduced from a knowledge of the most recent switching times and the actual value of $V_f$. Because a switching amplifier such as amplifier 124 can produce a voltage pulse having a time duration on the order of 0.8 $\mu$sec, which is far shorter in duration than the time constants of the stator windings, accurate control of the voltage at the motor terminals is possible, with the motor 111 input voltages appearing as sin waves over time. Elements 312–320 will be discussed below.

Although it has long been known that commutation information could be obtained by examining the voltage-to-current relationship ("V/I") at the input terminals of a motor, this information was thought to be too noisy, particularly as the motor slowed as it neared a commanded stopping position, and as it subsequently stopped, to be of practical benefit in determining and controlling rotor position.

What is, therefore, needed but not yet available is a brushless sensorless DC motor assembly that can repeatedly turn and accurately stop at a commanded position.

SUMMARY OF THE INVENTION

The present invention is a brushless DC motor assembly that includes a rotor and a set of stator windings that are adapted to drive the rotor. In addition, a power amplifier is adapted to apply a voltage to each stator winding in sequence according to a received sequence of switching signals. Also included is a terminal that is adapted to receive a commanded rotor stopping position from a user input device or a controlling computer. A current sensing assembly permit the determination of the current flowing through each stator coil to produce a sequence of stator coil current values over time. A data processor is configured to repeatedly calculate the switching signals for the amplifier based on computed rotor position and commanded rotor stopping position and to calculate the computed rotor position based on past switching signals and the stator coil current values. The sequence of computed rotor positions is used to slow the rotor as it approaches the commanded stopping position.

In a separate aspect, the present invention is a method for controlling the rotor position of a brushless DC motor assembly having a set of power terminals and a power amplifier adapted to apply a voltage to each power terminal in sequence according to a received sequence of timing signals. The method comprises, recording each of the timing signals; determining the current at each of the power terminals to form a sequence of stator coil current values; computing the rotor position based on the sequence of stator coil current values and the recorded timing signals; receiving a commanded rotor position; forming a comparison of the commanded rotor position to the computed rotor position; and adjusting the timing signal sequence in response to said comparison.

In another separate aspect of the present invention the amplifier is controlled to create a static electromagnetic field that is maintained without reference to any measurements after the rotor reaches a point within a predetermined distance of the commanded stopping point.

In yet another separate aspect the present invention is a brushless DC motor assembly similar to that described in the first paragraph of this section except for that the assembly additionally includes a set of voltage sensors, each electrically connected to a respective stator winding and producing a sequence of voltage measurements over time, which are used by the data processing assembly, along with the stator coil current values to calculate the computed rotor position.

The foregoing and other objectives, features, and advantages of the invention will be more readily understood upon consideration of the following detailed description of the invention, taken in conjunction with the accompanying drawings.

DETAILED DESCRIPTION OF THE PREFERRED EMBODIMENT

Figure 3:
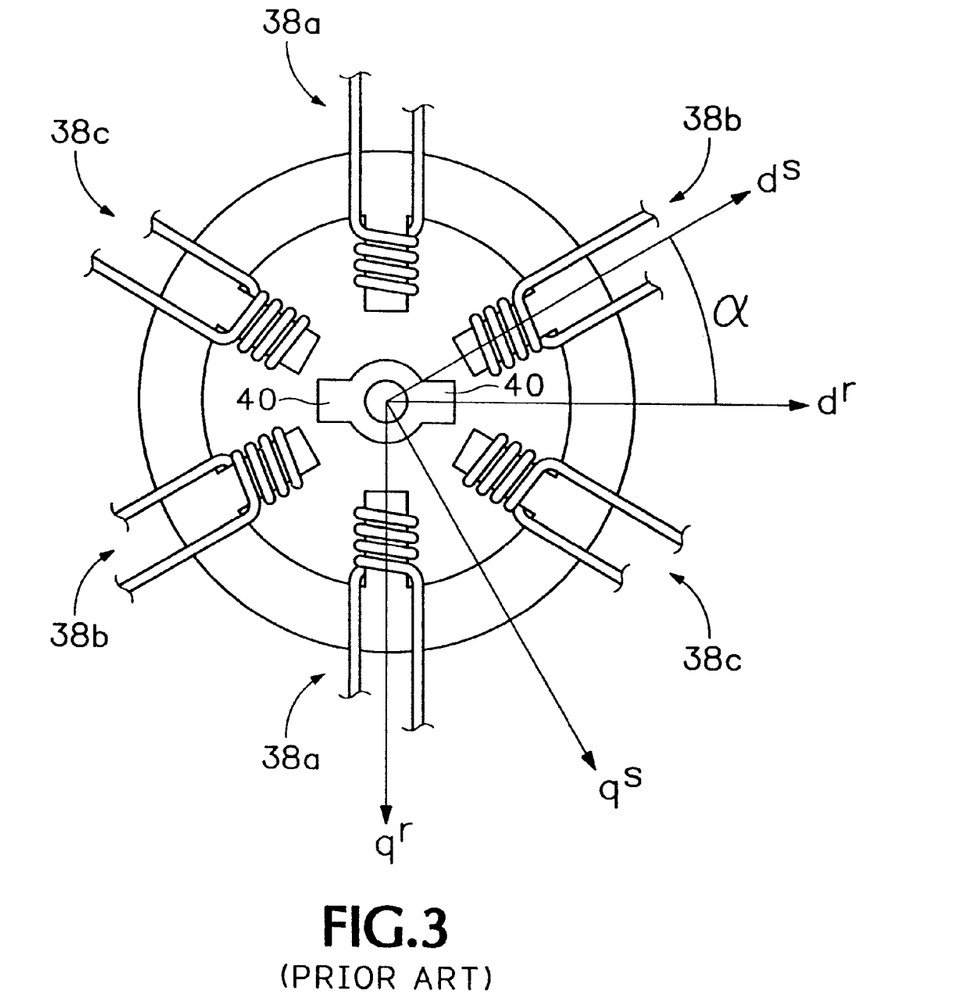
FIG. 3 is an illustration of a brushless DC motor.

FIG. 3 is an illustration of a prior art 2-pole brushless DC motor 11 that is presented here for the purpose of explaining a few coordinate system conventions that should make the remainder of this section easier to understand. There are three pairs of oppositely wound stator windings 38a, 38b, and 38c, driving a pair of oppositely charged rotor poles 40. Two coordinate systems are typically used in describing the electromagnetic fields of this motor. The first is a stationary system that is typically arbitrarily fixed with a direct axis or d-axis coinciding with one of the windings, and a quadrature or q-axis at 90°.

The other coordinate system used rotates with the rotor with the direct axis being coincident with an arbitrarily chosen rotor arm and the quadrature axis being at 90° to the direct axis. The stationary and rotating coordinate systems are distinguished a superscripted "s" or "r," respectively. The angle between the d-axis of the stationary coordinate system and the rotating coordinate system is designated $\gamma$ and is coincident with the position of the rotor, because the rotating coordinate system is defined in reference to the rotor.

Figure 4:
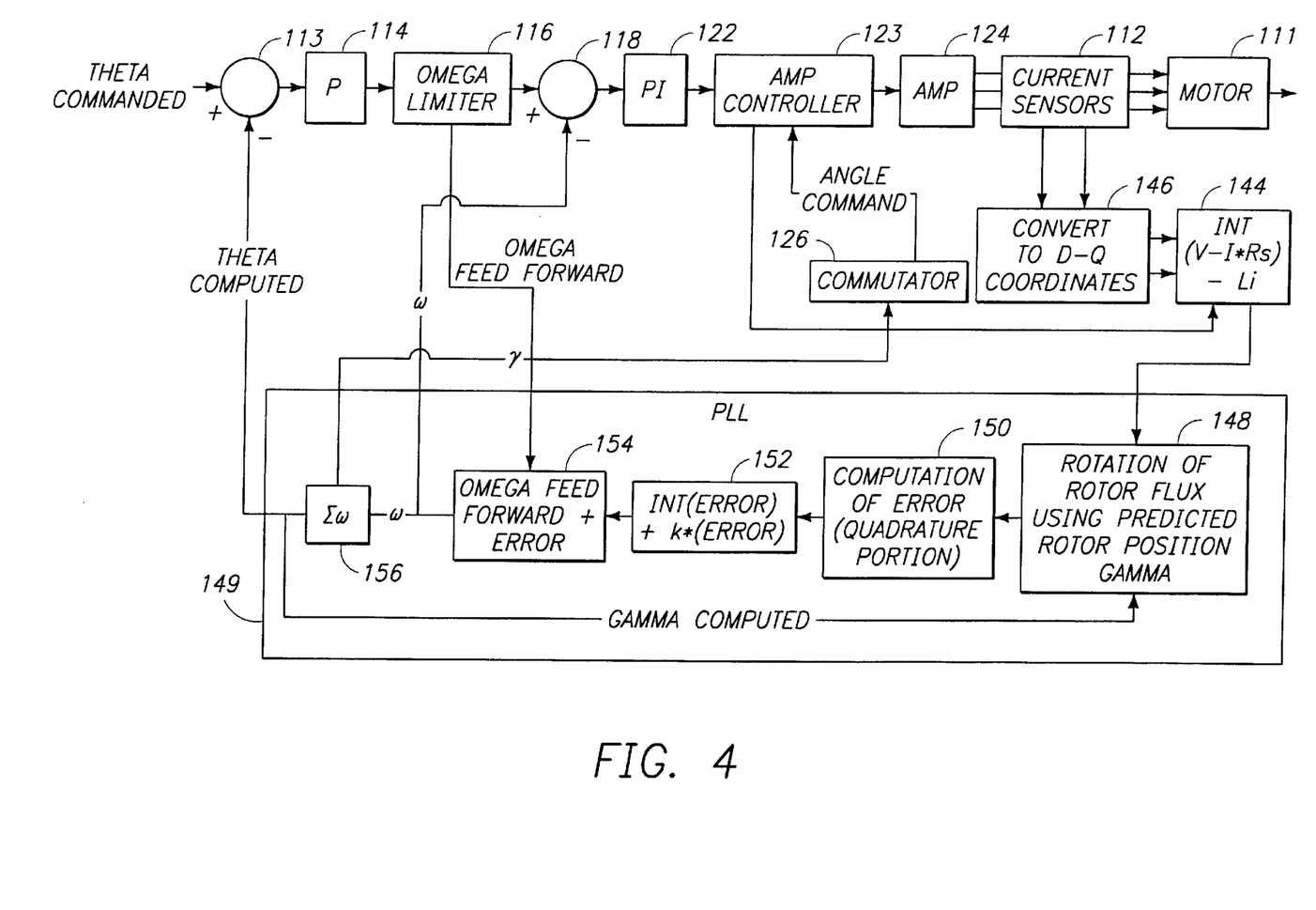
FIG. 4 is a block diagram, showing the servo loops, of a brushless DC motor assembly according to the present invention.

Referring to FIG. 4, a preferred embodiment of a brushless DC motor assembly 110 according to the present invention, is similar in general form to the prior art motor assembly 10 of FIG. 1. Similar or identical features are indicated with the same reference number plus 100. Again, everything but the amplifier 124, the current sensors 112 and the motor 111 may be implemented as software in a data processing assembly. Skilled persons will readily recognize, however, that many of these functions could be hardwired into a data processing assembly, and this also fits within the scope of the invention. The greatest difference between assembly 10 and assembly 110 is that assembly 110 does not include any position encoder, such as encoder 12 of assembly 10. Assembly 10 uses the periodic, digitized measurements, $I_{OA}$ to $I_{NA}$ and $I_{OB}$ to $I_{NB}$ formed by a set of current sensors 112, each of which is located at a power input terminal (stator winding) of the motor. The values of $I_{OC}$ to $I_{NC}$ are formed by subtracting $I_{OA}$ and $I_{OB}$ from zero. In a preferred embodiment, the periodicity of the current measurements is 0.5 msec. Referring to FIG. 2, current measurements may alternatively be formed in the amplifier 124, which is identical to amplifier 24. For example, if a single current sensor positioned as shown by sensor 312, or alternatively, positioned as sensor 314 could measure the current being sent from line $V_f$ to the active stator coil. Coupled with the transistor ($Q_1$ through $Q_6$) timing information, this yields the current through each stator coil. Alternatively, a set of current sensors, such as sensor 316 through 320 could yield the desired stator coil current information.

In block 146, the three phase measurement of current is transformed into a stationary d-q coordinate system to yield $I_{0d}$–$I_{nd}$ and $I_{00}$–$I_{nq}$ through a well known coordinate system transform that is not repeated here. In block 144, I, V and R in stationary d-q coordinates are used to compute the rotor flux, in the stationary d-q coordinate system, through equations 3 and 4. In one preferred embodiment, the voltage applied at each terminal, for each time interval 0, . . . , N is deduced based on a measurement of the $V_f$ (note FIG. 1)and knowledge of the commanded switching timing of transistors $Q_1$ through $Q_6$, from amplifier controller 123.

In another preferred embodiment the voltage at each stator terminal is measured using a pair of voltmeters, which in this preferred embodiment, are present in block 112.

$$\phi_{rd} = \Sigma_0^N (V_{sdn} - I_{sdn} R_s) dt - L i_{sdn} \quad (3)$$

$$\phi_{rq} = \Sigma_0^N (V_{sqn} - I_{sqn} R_s) dt - L i_{sqn} \quad (4)$$

Where:

L=Stator Inductance n=Current time interval $V_{sdn}$=Direct phase stator coil voltage at time interval n.

$V_{sqn}$=Quadrature phase stator coil voltage at time interval n.

$I_{sdn}$=Direct phase stator coil current at time interval n.

$I_{sqn}$=Quadrature phase stator coil current at time interval n.

In block 148, the first block of phase locked loop 149, the rotor flux is transformed into a frame of reference that is transposed from the stationary d-q frame of reference by an estimate of the angle $\gamma$ (which separates the stationary frame of reference from the rotating frame of reference). This estimate, $\gamma_e$, is formed in block 156 and will be described later. For the first time frame N=0, the rotor is driven to a predetermined starting position $\gamma_0$ and an arbitrary starting value is used for $\gamma_e$. Within a few time frames, $\gamma_e$ approaches the actual value of $\gamma_0$.

The transformation performed in block 148 is shown below in equation (5).

$$\begin{bmatrix} \phi_{rd}^r \\ \phi_{rq}^r \end{bmatrix} = \begin{bmatrix} \cos\gamma_e & -\sin\gamma_e \\ \sin\gamma_e & \cos\gamma_e \end{bmatrix} \begin{bmatrix} \phi_{rd}^s \\ \phi_{rq}^s \end{bmatrix} \quad (5)$$

The superscripts in the above equation indicate rotating versus stationary frames of reference.

The angle by which $\gamma_e$, differs from the actual rotor position $\gamma$ is referred to as the error angle and denoted as $\epsilon_n$, for a particular time interval n. The value of $\epsilon$ equals ARCTAN($\phi_{rq}^r/\phi_{rd}^r$), which, when it is small, is approximately equal to ($\phi_{rq}^r/\phi_{rd}^r$). This computation is performed in block 150. During normal operation $\epsilon$ will be quite small because $\gamma$ is continuously updated, so the estimate $\phi_{rq}^r/\phi_{rd}^r$ is quite accurate and is used.

The error value $\epsilon_n$ is fed through a PI block 152 to find the accumulated error $\epsilon_a$ in measured $\omega$.

$$\epsilon_a = k_3 \Sigma_0^N \epsilon_n dt + k_4 \epsilon n \quad (6)$$

In block 154 the value of $\epsilon_a$ is added to the commanded $\omega$ feed forward for time period N, $\omega_{ffN}$ from omega limiter 116 to form the $\omega$ measurement for time period N, $\omega_{mN}$. At comparator 118, this value is subtracted from $\omega_{ff(N+1)}$ in much the same way as in prior art control loop to find $\omega_{\delta(N+1)}$, which is used, as in prior art servo 10, to determine the commanded torque, $T_{C(N+1)}$.

Unfortunately, the computation of EQs. 3 and 4 becomes quite noisy when the rotor is turning slowly. This is because each term on the right side of these equations is a measured or deduced quantity that includes a measurement or deduction error in addition to the true or actual quantity. When the rotor is turning rapidly the true portion is large and dominates the measured or 115 deduced quantity. But when the rotor slows down, the error portion becomes a more significant part of the total quantity, thereby causing EQs. 3 and 4 to be less accurate then they are otherwise.

The use of the summation of EQ. 6 helps to mitigate the effect of measurement errors because any distortion in the value of $\epsilon$ is multiplied by dt which is always on the order of tenths of milliseconds, thereby reducing the effect of any particular measurement error in the equation.

Finally, in block 156, $\omega_{m0}, \ldots, \omega_{mN}$ are summed together to form $\gamma_{e(N+1)}$ and $\theta_{eN+1}$ (by convention $\gamma$ has values of no more than 360°, whereas $\theta$ may assume any value). The value $\gamma_{e(N+1)}$, as noted previously, is sent to block 148, to serve as the basis of the vector transformation into the rotating d-q coordinate system for the N+1 sampling time. The value $\theta_{e(N+1)}$ is sent to comparator 113 where it is subtracted from $\theta_{c(n+1)}$ to yield $\theta_\delta$, which is used in the same manner as in prior art assembly 10. As $\theta_{en}$ approaches $\theta_c$, $k(\theta_c - \theta_{en})$ becomes less than the $\omega_{max}$ imposed by the $\omega$ limiter 116 and $\omega_c$ is set to equal $k(\theta_c - \theta_{en})$. Therefore, the accuracy of $\theta_{en}$ is crucial to the accuracy of the rotor speed as it slows to a stop. Because of the computation method, including the use of a phase lock loop, this accuracy is great enough to produce excellent system performance.

Figure 5:
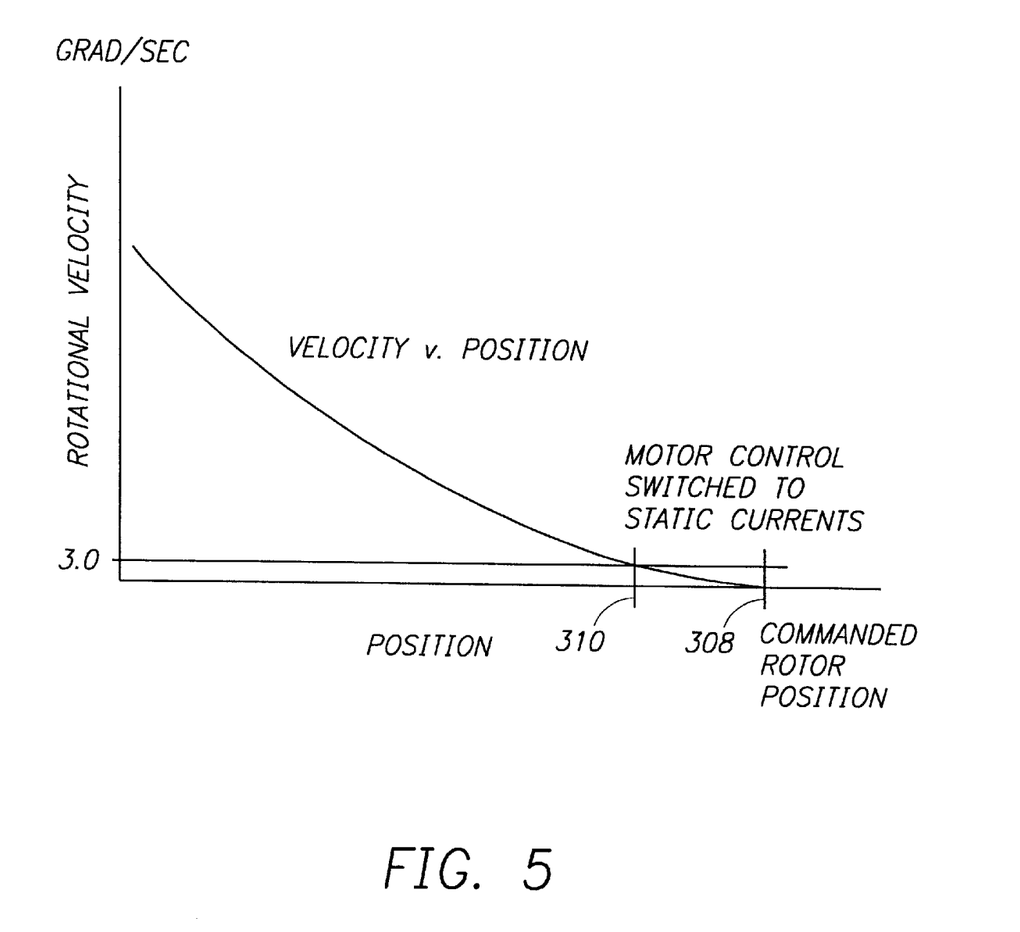
FIG. 5 is a graph of motor speed versus position.

Referring to FIG. 5, when the rotor approaches its commanded stopping position and, as a result, $\omega$ slows to less than 3 radians/sec, the control loops are opened up (i.e. computation is stopped) and the amplifier 124 is commanded to hold the rotor in place by the constant application of a fixed set of stator currents.

This avoids the problem of position measurement drift that occurs when the control loops are operated when the rotor is slowed or stopped. When the rotor is commanded to move again, its starting position for running the position control loop is set equal to the fixed position in which it was maintained. Although amplifier 124 is a switching amplifier, a constant current can be maintained because the switching period of 0.2 msec is much briefer than the time constant of the stator windings. Although the accuracy of this stopping position is effected by the anomalies and inaccuracies of the placement of the magnets and stator coils in BDCM 111, these anomalies and inaccuracies are permanent, so they do not reduce the precision of the repeatability of stopping. That is, if the same stopping position $\theta_c$ is commanded more than once, the rotor will stop in the exact same position (to within 1/8,000th part) both times. For any type of calibrated equipment, an x-y table for example, it is repeatability that determines the precision of the table placement, because the inaccuracies may be calibrated out of the system.

Figure 6:
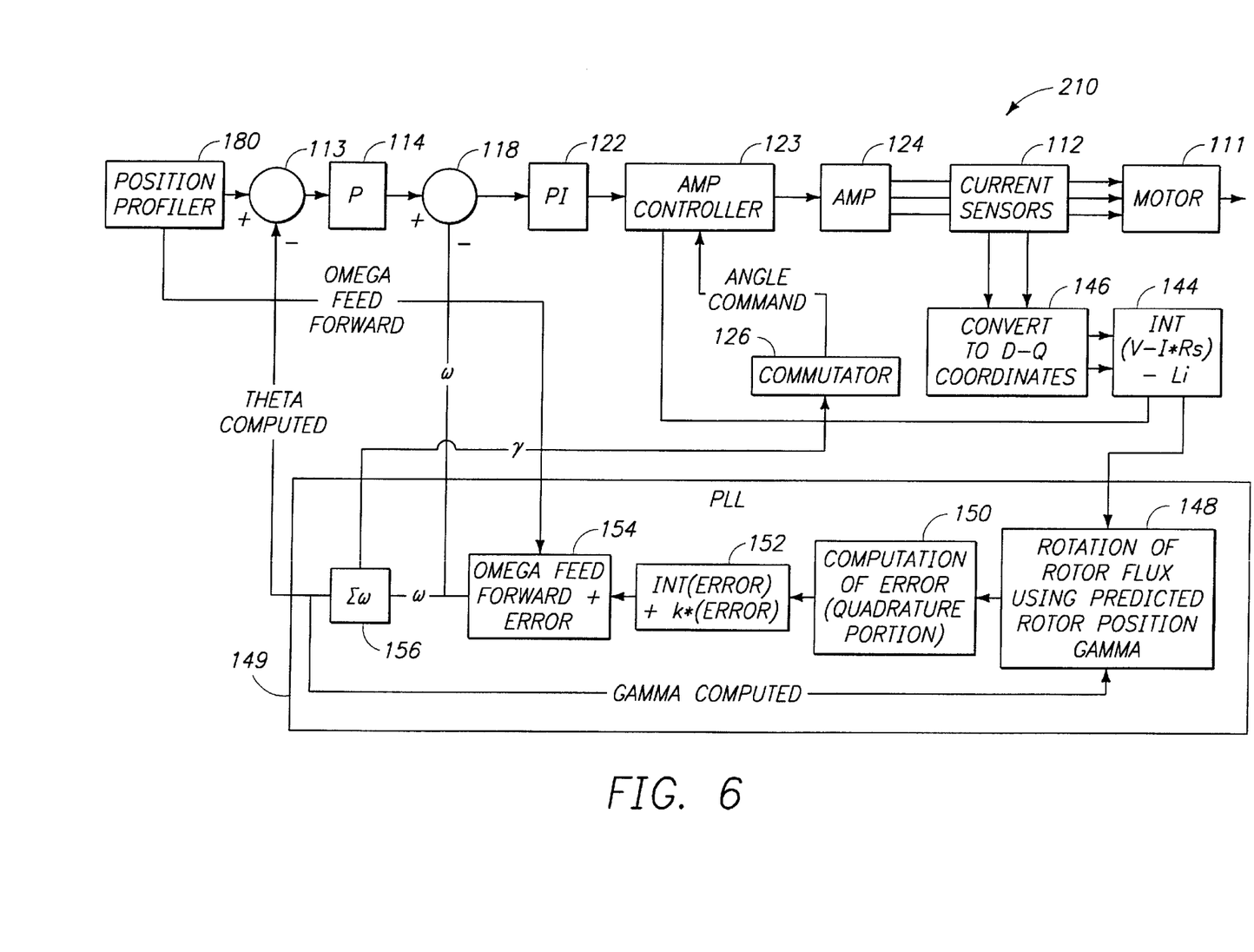
FIG. 6 is a block diagram, showing the servo loops, of an alternative brushless DC motor assembly according to the present invention.

FIG. 6 is a block diagram of an alternative preferred embodiment 210 of a brushless DC motor assembly. Components which are the same as for the embodiment shown in FIG. 4 are marked with identical reference numbers. Unlike embodiment 110, this embodiment includes a position profiler 180. Position profiler 180, commands a $\theta_c$ profile and was profile over time. This type of control is used, for example, in x-y tables during machining operations, when not only the ending position is important, but in which the exact position at each moment must be precisely controlled so that it is coordinated properly with machining equipment, (e.g., a laser) that is being activated and deactivated during the machining process. Because the position profiler 180 changes commanded $\theta_c$ over time in a manner that takes into account the maximum acceleration and rotational velocity of the motor 111, there is no need for the $\omega$ limiter of assembly 110.

The operation of assembly 210 is similar to the operation of assembly 110 except for that each position comparison at comparator 113 is critical. The gap between the current computed value of $\gamma$ and the commanded $\theta_c$ for the next time instance determines the rotational velocity desired for the next time interval, which is fed into PI block 122 to determine the torque command (also referred to as current command) for amplifier 124.

In the operation of both assembly 110 and assembly 210 the computed error $\epsilon$ is typically zero, because adding $\omega_{ff}$ to the latest computed error $\epsilon$ keeps $\gamma_c$ current. If there is a sudden change in load on the shaft (e.g. a new workpiece has been dropped onto the x-y table being moved by motor 111) the $\gamma$ error $\epsilon$ will take on a non-zero value, causing an adjustment to the value of commanded $\omega$ for the subsequent time interval until the rotor position $\delta$ equals the commanded $\theta_c$ from the position profiler 180.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A brushless DC motor assembly, comprising:
   (a) a rotor;
   (b) a set of stator windings adapted to drive said rotor;
   (c) a switching power amplifier adapted to apply a voltage to each stator winding in sequence according to a received sequence of switching signals;
   (d) a terminal adapted to receive a commanded rotor position;
   (e) a current sensing assembly permitting the determination of a sequence of stator coil current values over time for each stator coil; and (f) a data processing assembly configured to calculate said sequence of switching signals and a computed rotor position, said switching signals calculated based on a comparison of said computed rotor position and a said received commanded rotor position and said computed rotor position calculated based on said sequence of stator coil current values and said computed switching signals.

2. The motor assembly of claim 1 in which said most recent set of said computed switching signals is used to deduce the voltage at each stator winding input and wherein this deduced voltage is used, together with said stator coil current values, to calculate computed rotor position.

3. The motor assembly of claim 1 in which when the computed rotor position has approached said commanded rotor stopping position to within less than a predetermined amount, said switching signals are commanded independent of any calculation of computed rotor position, to force said rotor to said commanded rotor position.

4. The motor assembly of claim 1 in which for instances in which said commanded rotor stopping position is greater than said computed rotor position by greater than a predetermined amount, then the rotational velocity of said rotor is controlled to equal a predetermined value.

5. The motor assembly of claim 1 in which said switching power amplifier operates by-sequentially switching an electrical conductor having a substantially constant voltage into electrical contact with electrical conductors connected to said stator windings and further comprising a voltage measuring device for determining said substantially constant voltage and wherein said measuring device provides measurements of said voltage to said data processing assembly and said data processing assembly uses said measurements, along with said computed switching signals and said stator coil current values in said calculation of said computed rotor position.

6. The motor assembly of claim 1 in which said current sensing assembly includes at least two current sensors that are electrically connected to said stator coils for a direct measurement of the current flowing through said two stator coils.

7. A method for controlling the rotor position of a brushless DC motor assembly having a set of power terminals and a power amplifier adapted to apply a voltage to each power terminal in sequence according to a received sequence of timing signals, said method comprising:

(a) recording each said timing signal;

(b) determining the current at each of said power terminals to form a sequence of stator coil current values;

(c) computing said rotor position based on said sequence of stator coil current values and said recorded timing signals;

(d) receiving a commanded rotor position;

(e) forming a comparison of said commanded rotor position to said computed rotor position; and (f) adjusting said timing signal sequence in response to said comparison.

8. The method of claim 7 in which said most recent set of said computed switching signals is used to deduce the voltage at each stator winding input and wherein this deduced voltage is used, together with said stator coil current values, to calculate computed rotor position.

9. The method of claim 7 in which when the computed rotor position approaches said commanded rotor stopping position by less than a predetermined amount, said switching signals are commanded independent of any calculation of computed rotor position, to force said rotor to said commanded rotor position.

10. The method of claim 7 in which for instances in which said commanded rotor position is different than said computed rotor position by greater than a predetermined amount, a smaller predetermined difference value is effectively substituted for the actual difference value.

11. A brushless DC motor assembly, comprising:

(a) a rotor;

(b) a set of stator windings adapted to drive said rotor;

(c) a power amplifier adapted to apply a voltage to each stator winding in sequence according to a received sequence of switching signals;

(d) a terminal adapted to receive a commanded rotor stopping position;

(e) a current sensing assembly permitting the determination of a sequence of stator coil current values over time for each stator coil; and (f) a data processing assembly configured to form an estimate of rotor position and to calculate said sequence of switching signals based, in part, on said estimated rotor position and adapted to send an unchanging sequence of switching signals to said amplifier from the moment when said rotor reaches to within a predetermined distance of a commanded stopping position until a new commanded rotor stopping position is received at said terminal.

12. A brushless DC motor assembly, comprising:

(a) a rotor;

(b) a set of stator windings adapted to drive said rotor;

(c) a switching power amplifier adapted to apply a voltage to each stator winding in sequence according to a received sequence of switching signals;

(d) a terminal adapted to receive a commanded rotor position;

(e) a current sensing assembly permitting the determination of a sequence of stator coil current values over time for each stator coil;

(f) a set of voltage sensors, each electrically connected to a respective said stator winding and producing a sequence of voltage measurements over time; and (g) a data processing assembly configured to calculate said sequence of switching signals and a computed rotor position, said switching signals calculated based on a comparison of said computed rotor position and a said received commanded rotor position and said computed rotor position calculated based on said stator coil current values and said voltage measurements.

* * * * *